(12) United States Patent
Davis et al.

(10) Patent No.: US 7,730,394 B2
(45) Date of Patent: Jun. 1, 2010

(54) DATA BINDING IN A WORD-PROCESSING APPLICATION

(75) Inventors: Tristan A. Davis, Redmond, WA (US); Marcin Sawicki, Kirkland, WA (US); Brian M. Jones, Redmond, WA (US); Robert A. Little, Redmond, WA (US); Mark Sunderland, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/030,423

(22) Filed: Jan. 6, 2005

(65) Prior Publication Data

US 2006/0150085 A1 Jul. 6, 2006

(51) Int. Cl.
*G06F 17/00* (2006.01)
(52) U.S. Cl. ............... 715/235; 715/236; 715/237
(58) Field of Classification Search ........... 715/530, 715/235
See application file for complete search history.

(56) References Cited

U.S. PATENT DOCUMENTS

| | | | |
|---|---|---|---|
| 5,287,504 A | 2/1994 | Carpenter et al. | 707/201 |
| 5,440,745 A | 8/1995 | Platte et al. | 718/101 |
| 5,630,131 A | 5/1997 | Palevich et al. | 717/108 |
| 5,715,415 A | 2/1998 | Dazey et al. | 715/708 |
| 5,717,741 A | 2/1998 | Yue et al. | 379/88.12 |
| 5,845,299 A | 12/1998 | Arora et al. | 715/209 |
| 5,903,902 A | 5/1999 | Orr et al. | 715/202 |
| 5,910,075 A * | 6/1999 | Arnell et al. | 49/25 |
| 5,911,068 A * | 6/1999 | Zimmerman et al. | 719/328 |
| 5,974,430 A * | 10/1999 | Mutschler et al. | 715/505 |
| 5,991,878 A | 11/1999 | McDonough et al. | 726/9 |
| 6,006,239 A | 12/1999 | Bhansali et al. | 707/201 |
| 6,014,677 A | 1/2000 | Hayashi et al. | 707/104.1 |
| 6,088,431 A | 7/2000 | LaDue | 379/114.2 |
| 6,157,940 A | 12/2000 | Marullo et al. | 703/27 |
| 6,247,020 B1 | 6/2001 | Minard | |

(Continued)

FOREIGN PATENT DOCUMENTS

KR    2004-0020933 A    3/2004

(Continued)

OTHER PUBLICATIONS

Official Action in U.S. Appl. No. 10/955,612 dated Dec. 3, 2008.

(Continued)

*Primary Examiner*—Boris Pesin
(74) *Attorney, Agent, or Firm*—Merchant & Gould, P.C.

(57) ABSTRACT

A word processor application is provided for creating word processor documents wherein the data and presentation can be separated. Data can be stored in a separate location from the presentation surface of the word processor document. Users of the word processor application can establish links (or bindings) between the contents of the data and the presentation surface. A user can modify contents of a word processor document by directly changing the linked data without having to deal with the complexity of the presentation format, which can be constantly changing. A user can modify content of a word processor document, by editing a data store without any knowledge of the current layout of the presentation surface. A user can modify complex backing data through simple document edits, without exposure to the complexities of the data structure.

19 Claims, 3 Drawing Sheets

U.S. PATENT DOCUMENTS

| | | |
|---|---|---|
| 6,268,851 B1 | 7/2001 | Bricklin et al. ............. 715/744 |
| 6,275,824 B1 | 8/2001 | O'Flaherty et al. ............. 707/9 |
| 6,317,777 B1 | 11/2001 | Skarbo et al. ............... 709/294 |
| 6,397,351 B1 | 5/2002 | Miller et al. .................. 714/13 |
| 6,457,002 B1 | 9/2002 | Beattie et al. .................. 707/3 |
| 6,490,601 B1 | 12/2002 | Markus et al. ............. 715/507 |
| 6,507,856 B1 | 1/2003 | Chen et al. ................. 715/205 |
| 6,562,076 B2 | 5/2003 | Edwards et al. ............. 715/229 |
| 6,571,253 B1* | 5/2003 | Thompson et al. ....... 707/103 R |
| 6,629,843 B1 | 10/2003 | Bunting et al. .............. 434/118 |
| 6,731,314 B1 | 5/2004 | Cheng et al. ................ 715/848 |
| 6,859,821 B1 | 2/2005 | Ozzie et al. ................. 709/205 |
| 6,865,599 B2 | 3/2005 | Zhang ........................ 709/218 |
| 6,920,455 B1 | 7/2005 | Weschler .................... 707/100 |
| 6,944,622 B1 | 9/2005 | Mitchell et al. ............. 707/102 |
| 6,944,662 B2 | 9/2005 | Devine et al. ............... 709/225 |
| 6,950,990 B2 | 9/2005 | Rajarajan et al. ............ 715/736 |
| 6,996,769 B1 | 2/2006 | Peikes et al. ................ 715/512 |
| 7,017,112 B2 | 3/2006 | Collie et al. ................. 715/513 |
| 7,035,839 B1 | 4/2006 | Gillespie et al. ............... 707/2 |
| 7,039,708 B1 | 5/2006 | Knobl et al. ................ 709/227 |
| 7,039,863 B1* | 5/2006 | Caro et al. .................. 715/530 |
| 7,085,773 B2 | 8/2006 | Dorsett, Jr. ............... 707/104.1 |
| 7,111,284 B2 | 9/2006 | Takagi et al. ......... 707/E17.006 |
| 7,117,504 B2 | 10/2006 | Smith et al. ................. 719/328 |
| 7,200,816 B2 | 4/2007 | Falk et al. ................... 715/762 |
| 7,237,002 B1 | 6/2007 | Estrada et al. .............. 709/203 |
| 7,340,481 B1 | 3/2008 | Baer et al. ................ 707/104.1 |
| 7,386,563 B1 | 6/2008 | Pal .............................. 707/102 |
| 7,509,305 B2 | 3/2009 | Tozawa et al. ................. 707/3 |
| 7,657,832 B1* | 2/2010 | Lin ............................. 715/234 |
| 2001/0056463 A1 | 12/2001 | Grady et al. ................ 709/203 |
| 2002/0010716 A1* | 1/2002 | McCartney et al. ......... 707/517 |
| 2002/0013792 A1 | 1/2002 | Imielinski et al. ........... 707/523 |
| 2002/0065110 A1 | 5/2002 | Enns et al. ................... 455/566 |
| 2002/0085020 A1 | 7/2002 | Carroll, Jr. .................. 345/700 |
| 2002/0107867 A1 | 8/2002 | Takagi et al. ................ 707/102 |
| 2002/0133516 A1 | 9/2002 | Davis et al. ................. 707/513 |
| 2002/0161801 A1 | 10/2002 | Hind et al. .................. 707/513 |
| 2002/0198962 A1 | 12/2002 | Horn et al. .................. 709/218 |
| 2003/0007009 A1* | 1/2003 | Haley ......................... 345/805 |
| 2003/0018666 A1 | 1/2003 | Chen et al. .................. 707/513 |
| 2003/0018714 A1 | 1/2003 | Mikhailov et al. .......... 709/203 |
| 2003/0023632 A1 | 1/2003 | Ries et al. ................... 707/513 |
| 2003/0023953 A1 | 1/2003 | Lucassen et al. ............ 717/106 |
| 2003/0051054 A1 | 3/2003 | Redlich et al. .............. 709/246 |
| 2003/0097457 A1 | 5/2003 | Saran et al. ................. 709/230 |
| 2003/0159111 A1* | 8/2003 | Fry .............................. 715/513 |
| 2003/0163603 A1* | 8/2003 | Fry et al. ..................... 709/328 |
| 2003/0164859 A1 | 9/2003 | Evans ......................... 345/792 |
| 2003/0174162 A1 | 9/2003 | Wu ............................. 345/736 |
| 2004/0021679 A1* | 2/2004 | Chapman et al. ............ 345/700 |
| 2004/0073565 A1 | 4/2004 | Kaufman et al. ............ 707/101 |
| 2004/0088332 A1 | 5/2004 | Lee et al. .................... 707/200 |
| 2004/0088647 A1 | 5/2004 | Miller et al. ................. 715/500 |
| 2004/0103147 A1 | 5/2004 | Flesher et al. ............... 709/204 |
| 2004/0111672 A1 | 6/2004 | Bowman et al. ............ 715/513 |
| 2004/0153467 A1 | 8/2004 | Conover et al. ............. 707/100 |
| 2004/0183830 A1 | 9/2004 | Cody et al. ................. 715/747 |
| 2004/0199876 A1 | 10/2004 | Ethier et al. ................ 715/213 |
| 2004/0205565 A1 | 10/2004 | Gupta ......................... 715/513 |
| 2004/0205653 A1 | 10/2004 | Hadfield et al. ............. 715/530 |
| 2004/0217985 A9 | 11/2004 | Ries et al. ................... 715/740 |
| 2004/0220926 A1 | 11/2004 | Lamkin et al. ................. 707/3 |
| 2004/0225958 A1 | 11/2004 | Halpert et al. .............. 715/513 |
| 2004/0237036 A1 | 11/2004 | Quist et al. ................. 715/513 |
| 2004/0243938 A1* | 12/2004 | Weise et al. ................. 715/526 |
| 2004/0268240 A1 | 12/2004 | Vincent ...................... 715/513 |
| 2005/0014494 A1 | 1/2005 | Owen et al. ................. 455/419 |
| 2005/0027618 A1 | 2/2005 | Zucker et al. ................. 705/26 |
| 2005/0033667 A1 | 2/2005 | Sugimoto et al. ............. 705/28 |
| 2005/0033766 A1 | 2/2005 | Pang et al. ................ 707/104.1 |
| 2005/0034079 A1 | 2/2005 | Gunasekar et al. .......... 715/753 |
| 2005/0044145 A1 | 2/2005 | Quinn et al. ................ 709/205 |
| 2005/0050066 A1 | 3/2005 | Hughes ....................... 707/100 |
| 2005/0068913 A1 | 3/2005 | Tan et al. .................... 370/310 |
| 2005/0071477 A1 | 3/2005 | Evans et al. ................. 709/228 |
| 2005/0076295 A1 | 4/2005 | Simske et al. ............... 715/517 |
| 2005/0086384 A1 | 4/2005 | Ernst .......................... 709/248 |
| 2005/0091346 A1 | 4/2005 | Krishnaswami et al. ..... 709/220 |
| 2005/0091576 A1 | 4/2005 | Relyea et al. ............... 715/502 |
| 2005/0114771 A1 | 5/2005 | Piehler et al. ............... 715/536 |
| 2005/0154978 A1 | 7/2005 | Albornoz et al. ............ 715/513 |
| 2005/0183001 A1 | 8/2005 | Carter et al. ............. 715/501.1 |
| 2005/0187973 A1 | 8/2005 | Brychell et al. .......... 707/104.1 |
| 2005/0188349 A1 | 8/2005 | Bent et al. ................... 717/106 |
| 2005/0188350 A1 | 8/2005 | Bent et al. ................... 717/106 |
| 2005/0289457 A1 | 12/2005 | Obasanjo et al. ............ 715/513 |
| 2006/0031755 A1 | 2/2006 | Kashi .......................... 715/512 |
| 2006/0036692 A1 | 2/2006 | Morinigo et al. ............ 709/206 |
| 2006/0041558 A1 | 2/2006 | McCauley et al. ............ 707/10 |
| 2006/0048112 A1 | 3/2006 | Thiagarajan et al. ........ 717/144 |
| 2006/0053158 A1 | 3/2006 | Hall et al. .................... 707/102 |
| 2006/0053194 A1 | 3/2006 | Schneider et al. ........... 709/204 |
| 2006/0069987 A1 | 3/2006 | Jones et al. .................. 715/520 |
| 2006/0069989 A1 | 3/2006 | Jones et al. .................. 715/526 |
| 2006/0080590 A1 | 4/2006 | Jones et al. .................. 715/500 |
| 2006/0136441 A1 | 6/2006 | Fujisaki ....................... 707/101 |
| 2006/0195413 A1 | 8/2006 | Davis et al. .................... 707/1 |
| 2006/0195777 A1 | 8/2006 | Davis et al. ................. 715/500 |
| 2006/0195783 A1 | 8/2006 | Davis et al. ................. 715/513 |
| 2006/0282452 A1 | 12/2006 | Takagi et al. ................ 707/101 |
| 2007/0061382 A1 | 3/2007 | Davis et al. ................. 707/201 |

FOREIGN PATENT DOCUMENTS

| | | |
|---|---|---|
| KR | 2004-0034327 A | 4/2004 |
| WO | WO 01/08033 A2 | 2/2001 |
| WO | WO 01/08033 A3 | 2/2001 |
| WO | WO 01/11486 A2 | 2/2001 |
| WO | WO 01/11486 A3 | 2/2001 |
| WO | WO 01/15004 A2 | 3/2001 |
| WO | WO 01/95515 A2 | 12/2001 |
| WO | WO 01/95515 A3 | 12/2001 |

OTHER PUBLICATIONS

Memorandum and four figures regarding StarOffice 5.1; date is unknown, but believed to be earlier than Jan. 5, 2001, 5 pp.

Habraken, Jr., StarOffice 5.2 Calc Handbook, Prentice Hall, Dec. 2000, Chapter 2, 5 pp.

Comai et al., "Computing Graphical Queries Over XML Data", ACM Transactions on Information Systems TOIS, Oct. 2001, ACM Press, vol. 19 No. 4, 371-430 pp.

Leslie, "Using Javadoc and XML to Produce API reference Documentation", SIGDOC '02, Oct. 23, 2002, AMC Press, p. 104-109.

Sun et al., "Operational Transformation for Collaborative Word Processing", Proceedings of the Conference of CSCW'04, Nov. 10, 2004, ACM Press, p. 437-446.

Altova, "xmlspy5: User & Reference Manual", Jan. 3, 2003, www.altova.com, pp. 13-30, 698-701, 890.

McKenzie et al., "XFA Template Version 1.0", http://www.w3.org/1999/05/XFA/xfa-template, retrieved on May 30, 2008, 60 pp.

Heslop et al., "Word 2003 Bible", Wiley Publishing, 2003, pp. 441-443.

Souchon et al., "A Review of XML-compliant User-Interface Description Languages," LNCS, copyright Springer-Verlag 2003, pp. 377-391.

Meyer, "A Tool-Creating Validated XML Documents on the Fly Using MS Word," SIGDOC, copyright Oct. 2002, ACM, pp. 113-121.

Sun_Micro, How to Write Doc Comments for the Javadoc Tool, Sep. 2004, pp. 1-16.

Sala, et al., ML 3.0 Smoothed Aggregation User's Guide, Computational Math and Algorithms, Sandia Notational Laboratories, May 2004, pp. 3-66.

Official Action in U.S. Appl. No. 10/955,612 dated Sep. 19, 2006.
Official Action in U.S. Appl. No. 11/030,423 dated Nov. 22, 2006.
Official Action in U.S. Appl. No. 11/030,423 dated May 15, 2007.
Official Action in U.S. Appl. No. 11/066,083 dated Jun. 4, 2007.
Official Action in U.S. Appl. No. 11/066,117 dated Jun. 21, 2007.
Official Action in U.S. Appl. No. 11/067,383 dated Jun. 28, 2007.
Official Action in U.S. Appl. No. 11/030,423 dated Oct. 4, 2007.
Official Action in U.S. Appl. No. 11/066,117 dated Feb. 15, 2008.
Official Action in U.S. Appl. No. 10/955,612 dated Mar. 10, 2008.
Official Action in U.S. Appl. No. 11/066,083 dated Mar. 11, 2008.
Official Action in U.S. Appl. No. 11/065,754 dated Jun. 13, 2008.
Official Action in U.S. Appl. No. 11/066,058 dated Oct. 1, 2008.
Official Action in U.S. Appl. No. 11/066,117 dated Oct. 14, 2008.
European Search Report dated Dec. 19, 2007 in EP 05112126.7.
European Search Report dated Dec. 19, 2007 in EP 05112131.7.
European Search Report dated Jun. 12, 2008 in EP 05105427.8.
European Examination Report dated Mar. 3, 2008 in EP 05112126.7.
European Examination Report dated Mar. 3, 2008 in EP 05112131.7.
Chinese First Office Action dated May 9, 2008 in 20050088514.8 .
Chinese First Office Action dated Aug. 29, 2008 in 200510128895.8.
Office Action mailed Dec. 9, 2008, for U.S. Appl. No. 11/066,083.
Ladd et al., "Using HTLM, 4, XML and Java 1.2", Que, Platinum Edition, Dec. 1998, pp. 693-701.
Narravula et al., "Supporting Strong Coherency for Active Caches in Multi-Tier Data-Centers over InfiniBand", ANL.gov, 2004, pp. 1-10 (retrieved from CiteseerX May 5, 2009).
Narravula et al., "Designing Efficient Cooperative Caching Schemes for Multi-Tier Data-Centers over RDMA-enabled Networks", OCU-CISRC-6/05-TR39, Jun. 2005, pp. cover page, 1-10 (retrieved from Internet May 5, 2009).
Official Action in U.S. Appl. No. 10/955,612, dated May 18, 2007.
Official Action in U.S. Appl. No. 11/331,586 dated Jul. 26, 2007.
Official Action in U.S. Appl. No. 11/332,468 dated Dec. 17, 2007.
Official Action in U.S. Appl. No. 11/331,586 dated Dec. 27, 2007.
Official Action in U.S. Appl. No. 11/332,468 dated Jul. 18, 2008.
Official Action in U.S. Appl. No. 11/331,586 dated Sep. 29, 2008.
Official Action in U.S. Appl. No. 11/065,754 dated Jan. 22, 2009.
Official Action in U.S. Appl. No. 11/332,468 dated Mar. 11, 2009.
Official Action in U.S. Appl. No. 11/066,177 dated Apr. 8, 2009.
Official Action in U.S. Appl. No. 11/066,058 dated Apr. 13, 2009.
Official Action in U.S. Appl. No. 11/331,586 dated May 12, 2009.
PCT Search Report dated Jan. 16, 2007 in PCT/US2006/034802.
PCT Search Report dated Mar. 12, 2007 in PCT/US2006/034974.
European Communication dated Mar. 31, 2006 in EP 06100594.8.
European Communication dated May 13, 2009 in EP 05105427.8.
Chinese First Office Action dated Jul. 4, 2008 in 200510128896.2.
Chinese First Office Action dated Nov. 7, 2008 in 200610007194.3.
Chinese Second Office Action dated Nov. 21, 2008 in 200510088514.8.
Official Action in U.S. Appl. No. 10/955,612 dated Jun. 25, 2009.
Chinese Third Office Action dated Jun. 5, 2009 in 200510088514.8.

* cited by examiner

DATA BINDING IN A WORD-PROCESSING APPLICATION

BACKGROUND OF THE INVENTION

Markup Languages have attained wide popularity in recent years. One type of markup language, Extensible Markup Language (XML), is a universal language that provides a way to identify, exchange, and process various kinds of data. For example, XML is used to create documents that can be utilized by a variety of application programs. Elements of an XML file typically have an associated namespace and schema.

A namespace is a unique identifier for a collection of names that are used in XML documents to define element/attribute names and types. The name of a namespace is commonly used to uniquely identify each class of XML document. The unique namespaces differentiate markup elements that come from different sources and happen to have the same name.

XML Schemata provide a way to describe and validate data in an XML environment. A schema states what elements and attributes are used to describe content in an XML document, where each element is allowed, what types of content is allowed within it and which elements can appear within which other elements. The use of schemata ensures that the document is structured in a consistent and predictable manner. Schemata may be created by a user and generally supported by an associated markup language, such as XML. By using an XML editor, the user can manipulate the XML file and generate XML documents that adhere to the schema the user has created. In previous word processor applications, support for custom XML schemas was added to the application, enabling users to 'tag' contents of a document with custom XML markup (e.g. <title>), essentially giving semantic meaning to what was previously an unclassified run of text. This meant that a document, which was previously just text with formatting, but no meaning for other applications to process, could now be a structured XML document containing specific pieces of XML markup from any user-defined XML schema that any other XML-aware application could locate and understand.

In a basic example, the text at the top of a document could be 'tagged' as a title with a <title> XML element from a user-defined XML schema, which means that other XML-aware applications can now easily understand that this range of text contains a "title" and extract it appropriately. This enables a backend process to intelligently extract parts of the document with appropriate semantics and context (e.g. this text is the <title>).

However, the drawbacks associated with prior word processor applications stem from the fact that the addition and persistence of custom XML markup is tied to the presentation of the document. That is, in the existing implementations there is an inexorable link between the XML markup of a word processor document (for example, the details of a customer invoice expressed in XML format) and its presentation on the document surface (three paragraphs of plain text followed by a table with 5 columns and 4 rows w/ a specific table style, for example). Therefore, the XML data represented in prior word processor applications (because it is tied to the presentation) must coincide exactly with the content of the document. For example, if the XML schema for the invoice states that <date> comes before <address>, which comes before <phoneNumber>, then those three XML elements must appear in exactly that order as presented in the document. This means that changes to the presentation format (e.g. moving a table row around which contains <date>) will also cause changes to the structure of the XML data contained in that document, which requires extra steps on the part of the solution developer to ensure this data conforms to the structure of the associated XML schema. Thus, the end user of the document is not afforded the freedom to manipulate the presentation freely, because doing so might invariably change the semantics of the data, potentially violating the XML schema for that data.

Additionally, solutions developed on top of prior word processor applications need to more carefully consider the implications of the presentation when attempting to read/write data from a document for a backend application. So, if a paragraph of bold text is tagged as a title, the resulting XML saved by prior word processor applications would look like:

```
<w:p>
    <Title>
        <w:r>
            <w:rPr>
                <w:b/>
            <w:rPr>
                <w:t>This is the title.</w:t>
        </w:r>
    </Title>
<w:p>
```

As shown above, the custom XML tagging is surrounded on both sides by XML tags that are very specific to the prior word processor application—in this example, w:p, w:r, etc. This means that a XML-aware solution which is processing this data must not only understand its own data format (which contains the <Title> element), but must also understand the exact details of the prior word processor application formatting, so it knows to traverse and ignore that information as it is searching for its own data. Accordingly, this kind of implementation still imposes some requirements on the user, because small changes in the look of the text in the document (for example, dragging the contents of the <Title> element into a table cell, etc.) can result in significant changes the location of the custom XML tags within the surrounding word processor's native tags. Thus, a programmer/code developer often needs to write additional code to anticipate and understand where the prior word processor applications is going to put the custom XML elements based on the presentation and deal with all of the various permutations. This means the resulting solution may still need to contain significant logic code for dealing with specific prior word processor application needs.

Programmers/code developers working with the prior word processor applications also need to take into consideration the implications of a document's layout format when considering reading and writing operations. For example, a user might attempt to grab the value of a <StockSymbol> element and use it to place the full name of a company in the <CompanyName> element in the same document as a simple enhancement for a user writing a company report. To maintain the document's integrity, the user needed to consider, both on the reading and writing of the desired data from the document, the current layout format of the document before they could write functional code to perform these actions. For example, the user might need to know if the value they were writing was in a table cell, a bulleted list, etc., in order to construct the prior word processor application's formatting information that, when inserted into the document, would produce the desired result. This is another potential reason for additional coding in order to understand the word processor application's presentation semantics.

Yet another limitation of prior word processor applications is that XML elements' editing behaviors can sometimes be perceived as "fragile." This is partly because, as discussed above, they are limited by the fact that the positioning of the tags on the document surface determines the structure of the XML data based on the user defined schema. Accordingly, a number of issues may arise. First, typical user operations (e.g. copy/paste from one section to another) may alter the XML structure and render the document invalid according to the associated XML schema. Second, in such word processor implementations, all elements required by the customer-defined XML schema need to be included in some form on the document surface. This means that developers may have a hard time creating associated XML data as a method for carrying around additional information about the document which is not displayed on the document surface, but serves more as metadata. And, third, elements which are semantically unnecessary on the document surface (e.g. non leaf elements which are not marking up mixed content) need to be included as well in such word processor implementations, further increasing the ability of common user operations to modify the XML data.

In many cases, the schema which defines the XML data (for example, the data that comprises a memo document) tends to be rigidly defined by a single standards body in order to facilitate the communication of this data between multiple heterogeneous processing systems. However, in so facilitating the backend communication, often the human readability and editability of the document data is sacrificed, which making it difficult for a user to understand and parse this data. For example, the XML standard might define a standard format for dates, such as: dd-mm-yyyyThh:mm:ss.ssss. All dates are required to be represented in this format to be parsed by XML-aware applications. Obviously, this format is hard for the user to enter correctly, and often clashes with the way in which the user typically enters dates (e.g. many locales typically use mm-dd-yyyy instead of dd-mm-yyyy, etc.).

Thus, what is needed is a way to enable developers to separate the XML data and the presentation of such data in an application, such as a word processor application.

SUMMARY OF THE INVENTION

Embodiments of the invention provide a word processor application for creating word processor documents wherein the data and presentation can be separated. More particularly, data can be entered into and extracted from a word processor document which is stored in a separate location from the presentation format of the word processor document. According to embodiments of the invention, users of the word processor application can create a separate storage location for the word processor document data and establish links (or bindings) between the contents of that data and the presentation surface. A user of the word processing application can modify content of the presentation of a word processor document by directly changing the linked data without having to deal with the complexity of the presentation format, which can be constantly changing. Separating the view/presentation and the data allows the user to continue to edit the document in free-form, while allowing the data to be represented in the persistent file format in a single known structural format. When using an external process to modify content of a word processor document, a user can edit a separate piece of XML data stored within the word processor file without any knowledge of the current layout of the presentation surface or format. These links (or bindings) are also created such that changes to the structure of the presentation surface does not determine the structure of the XML data, and conversely, that changes to the structure of the XML data does determine the layout of the presentation surface of the word processor document—these links can be created or broken without adversely impacting the contents of the document. Embodiments of the invention tend to simplify adding, editing, and extraction of structured data in a word processor document.

According to embodiments of the invention, a word processor document may be tagged with semantics for specific regions of text but the associated data is now stored in a separate XML data file within the document. The data is linked to the range of text in the document, i.e. tagged regions, using a data binding. Accordingly, data can now be stored in a consistent location ("the data store") in its own XML data file regardless of where the data binding puts that content in the presentation surface of the document or how that data is presented. Thus, a user does not have to worry about data being moved/changed/deleted/etc. in the document, because the XML structure for that data is located within the custom XML in a consistent location and cannot be affected by changes to the presentation surface. Moreover, embodiments of the invention provide a programming interface for the word processor application. A user can use the programming interface to develop code for reacting to changes in the data store or one or more areas of the document.

DETAILED DESCRIPTION OF THE PREFERRED EMBODIMENT

Figure 1:
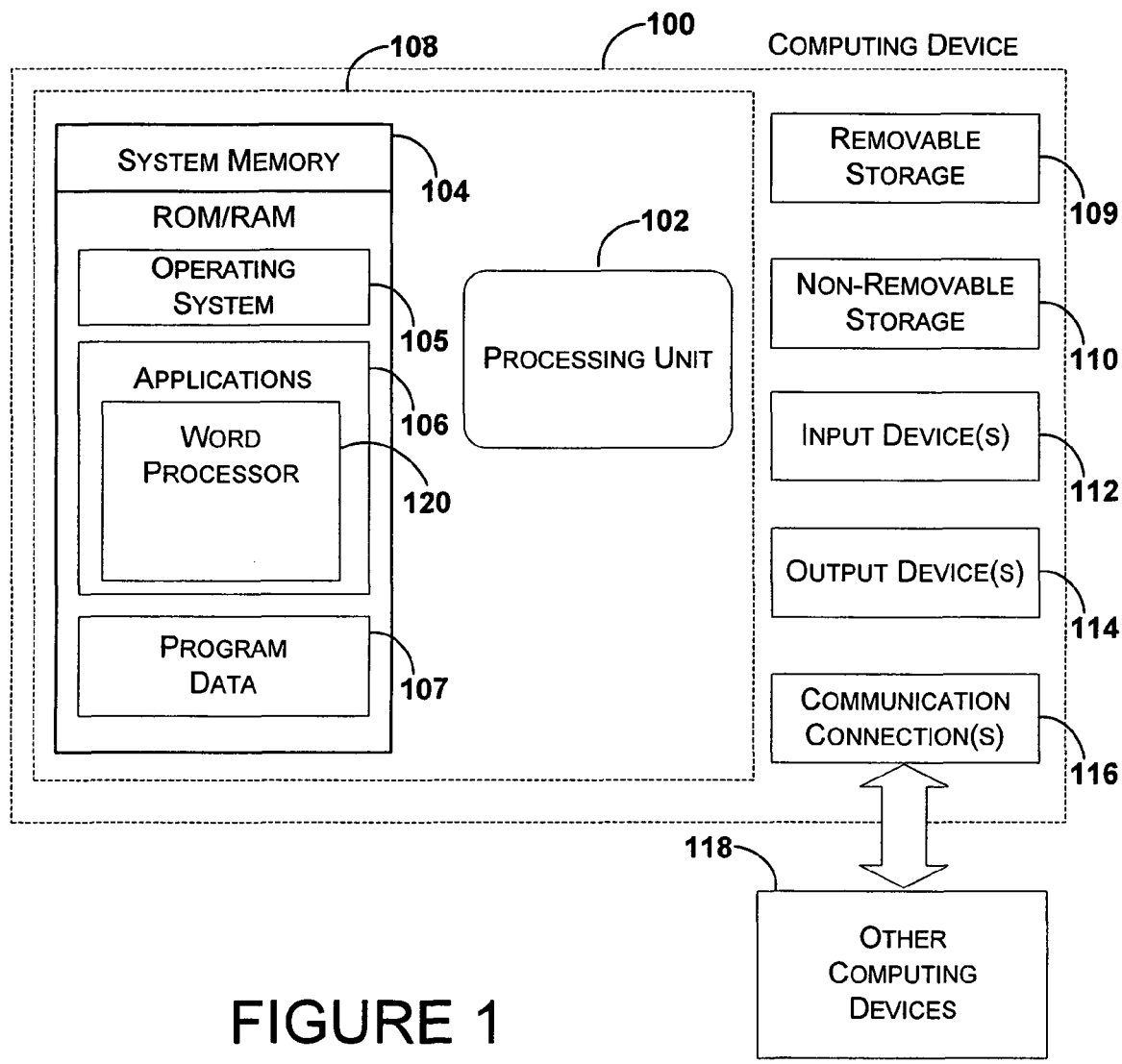
FIG. 1 illustrates an exemplary computing device that may be used in one exemplary embodiment of the present invention.

Throughout the specification and claims, the following terms take the meanings explicitly associated herein, unless the context clearly dictates otherwise.

The term "data" refers to any supplementary information which is carried with, referred to, or used by the word processing document. This information is often large and is likely not exposed on the presentation layer of the document in its entirety.

The terms "markup language" or "ML" refer to a language for special codes within a document that specify how parts of the document are to be interpreted by an application. In a word processor file, the markup language specifies how the text is to be formatted or laid out.

The term "element" refers to the basic unit of an XML document. The element may contain attributes, other elements, text, and other content regions for an XML document.

The term "presentation" refers to the visible portion of the document—the text and layout that would appear if the document were printed.

The term "tag" refers to a character inserted in a document that delineates elements within an XML document. Each element can have no more than two tags: the start tag and the end tag. It is possible to have an empty element (with no content) in which case one tag is allowed.

The XML content between the tags is considered the element's "children" (or descendants). Hence other elements embedded in the element's content are called "child elements" or "child nodes" or the element. Text embedded directly in the content of the element is considered the element's "child text nodes". Together, the child elements and the text within an element constitute that element's "content".

The term "attribute" refers to an additional property set to a particular value and associated with the element. Elements may have an arbitrary number of attribute settings associated with them, including none. Attributes are used to associate additional information with an element that will not contain additional elements, or be treated as a text node.

The term "content region" refers to a bounded and/or optionally labeled region of a document which serves as a container for a type of content entered by a user. See "Methods, System, and Computer-Readable Medium For Managing Specific Types of Content In An Electronic Document," filed on Sep. 30, 2004 and assigned U.S. Ser. No. 10/955,612, by the present assignee, which is hereby incorporated by reference in its entirety.

"XPath" is an operator that uses a pattern expression to identify nodes in an XML document. An XPath pattern is a slash-separated list of child element names that describe a path through the XML document. The pattern "selects" elements that match the path.

The term "XML data store" refers to a container within the word processing document which provides access for storage and modification of the data (in XML format, for example) stored in the word processor document while the file is open.

The term "data binding" refers to a property on a content region which determines the XPath location in one or more pieces of XML data inside a word processor document where the contents of the content region may be stored. As used herein:

"ref"—refers to a unique integer for each bound XML document used by the individual bindings;

"ID"—refers to the unique ID for a particular in the XML data store;

"selectionNamespaces"—refers to the prefix mappings (which associate a namespace with a short abbreviation) for the associated XML document in the XML data store; and, "rootURI"—refers to the root namespace of associated XML document in the XML data store.

Illustrative Operating Environment

Embodiments of the invention provide a word processor application for creating word processor documents wherein the storage of XML data and presentation can be separated. More particularly, data which can be entered into and extracted from a word processor document is stored in a separate location from the presentation format of the word processor document. Accordingly, users of the word processor application can create a separate storage location for the XML data contained within a word processor document and establish links (or bindings) between the contents of that data and the presentation surface, enabling the user to edit the associated XML data by editing the contents of the presentation, but by the same token, preventing the user from changing the structure of the associated XML data. For example, the data for an invoice can be stored separately as XML in the word processor file format so that moving around the positions of the links in the document does not change the structure of the separate data store. Thus, backend processing of this structured data is made easier, as the data now has a known structure which is unaffected by the way the user edits the document. A user can edit the data, format the data, including rich presentation formatting, etc. in the word processor document, and only the changes to the text content is 'pushed' back to the XML data stored behind the document. According to the invention, however, all the data updated that are made via user interaction with the word processor document are available in an original native stream of XML. The invention therefore also enables the modification of the contents of a word processor document by directly changing the linked XML data without having to deal with the complexity of the presentation format of that data, which again can be constantly changing. In so doing, it greatly simplifies the addition, editing, and extraction of structured data in a word processor document.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 may include a word processor application 120. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

Computing device 100 may also contain communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

A number of program modules and data files may be stored in the system memory 104 of the computing device 100, including an operating system 105 suitable for controlling the operation of a networked personal computer, such as the WINDOWS XP operating system from MICROSOFT Corporation of Redmond, Wash. System memory 104 may also store one or more program modules, such as word processor application 120, and others described below. Word processor application 120 is operative to provide functionality for creating, editing, and processing electronic documents.

According to one embodiment of the invention, the word processor application 120 comprises the WORD program from MICROSOFT Corporation. It should be appreciated, however, that word processor application programs from other manufacturers may be utilized to embody the various aspects of the present invention. It should further be appreciated that the various aspects of the present invention are not limited to word processor application programs but may also utilize other application programs 106 which are capable of processing various forms of content (e.g. text, images, pictures, etc.), such as spreadsheet application programs, database application programs, presentation application programs, drawing or computer-aided application programs, etc.

Embodiments of the invention may be implemented as a computer process, a computing system, or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

Binding Data in a Word Processor Application

Figure 2:
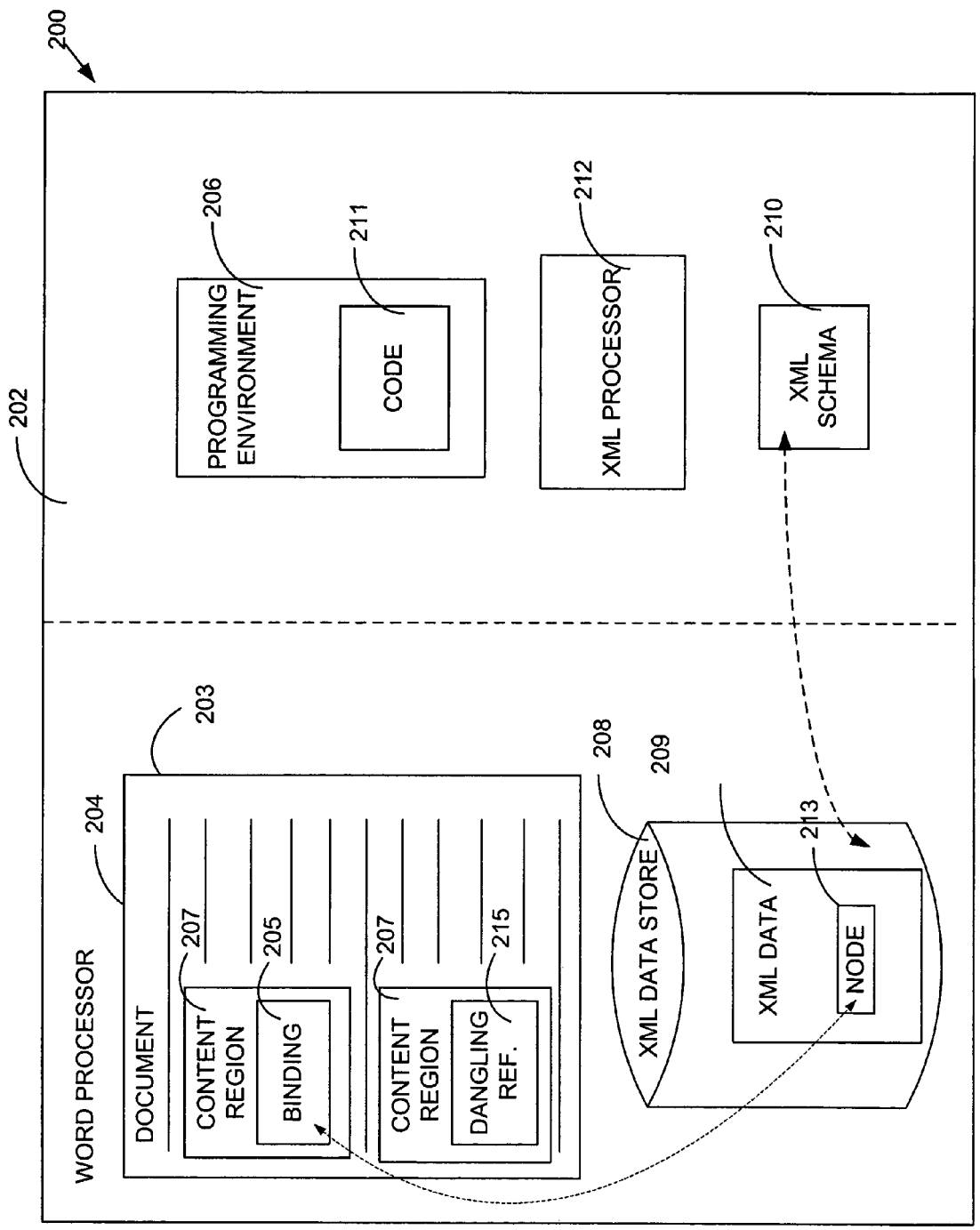
FIG. 2 is a block diagram illustrating an exemplary environment for practicing the present invention; and, FIG. 3 is a flow diagram according to an embodiment of the present invention.

FIG. 2 is a block diagram illustrating an exemplary environment for practicing embodiments of the present invention. The exemplary environment shown in FIG. 2 is a word processor environment 200 that includes a word processor application 202, word processor document 204, programming environment 206, data store 208, schema file 210, and XML processing module 212. However, as described above, the invention is also applicable to other application programs 106 capable of processing various forms of content (e.g. text, images, pictures, etc.), such as spreadsheet application programs, database application programs, presentation application programs, drawing or computer-aided application programs, and others. The programming module 206 can provide a simple application programming interface (API) for the XML processing module 212, which allows the development of code that modifies the content of either the document 204 or the XML data store 208 contents. It will be appreciated that the invention is not intended to be limited by any particular embodiments or examples described herein. For example, the word processor environment may include a plurality of word processor documents 204, data stores 208, and/or schema files 210. According to an embodiment of the invention, the XML processing module 212 is used by word processor application 202 for processing data formatted according to the Extensible Markup Language. A suitable XML processing module 212 is MSXML manufactured and marketed by MICROSOFT Corporation of Redmond, Wash.

The word processor application 202 includes its own namespace or namespaces and a schema 210, or a set of schemas, that is defined for use with document(s) 204 associated with word processor application 202. The set of tags and attributes defined by the schema 210 for word processor application 202 define the format of document 204. As described below, and according to embodiments of the invention, the data store 208 may include data 209. Preferably, the schema 210 is attached to the data 209 within the data store 208. The word processor document 204 also includes content regions 207 created by a user, as described below. More than one data store 208, associated XML data 209 and schema 210 may be included as part of the word processor application 202. In order to provide XML data 209 with a set of grammatical and data type rules governing the types and structure of data that may be included in a given XML data 209, one or more XML schema 210 may be associated with the XML data 209 for providing the rules governing each of the XML elements and tags with which the user may annotate the given XML data 209. The schema 210 includes the rules governing the order with which those elements may be applied to the XML data 209 and specific rules associated with individual elements applied to the XML data 209.

Embodiments of the invention provide a word processor application 202 operable to create word processor documents 204 wherein the data and presentation can be separated via the presence of a separate data store 208 which is stored with the word processing document. More particularly, data which can be entered into and extracted from a word processor document 204 is stored in one or more XML data 209 files within the document's data store 208, thereby separating the data from the presentation format of the word processor document 204. Accordingly, users of the word processor application 202 can create a separate storage location for the data of a word processor document 204 and establish links (or bindings) 205, associated with one or more content regions 207, between the contents of that data and the presentation surface 203, enabling the user to edit the data by editing the contents of the presentation, but by the same token, preventing the user from changing the structure of the data 209. Moving around positions of the content regions 207 in the document 204 does not change the structure of the XML data 209 in the separate data store 208. Moreover, changes made to the data presentation, bold, italic, justification, etc. do not affect the data structure. Thus, backend processing of the structured data is simplified since the XML data 209 corresponds to a known structure which is unaffected by the way a user edits the document 204.

Embodiments of the invention enable the modification of the contents of a word processor document 204 by directly changing the linked data without having to deal with the complexity of the presentation format, which can be constantly changing. In so doing, it greatly simplifies the addition, editing, and extraction of structured data in a word processor document 204. Moreover, data bindings 205 bound to structured XML data 209 may be moved around in the document 204 without affecting the structure of the data. The data bindings 205 on the content regions 207 are preferably enabled using an XPath expression, which may be defined via a user interface or programming window 206.

A user uses the XPath expression (a standard XML method for identifying a node 213 in an XML tree) to uniquely identify a desired XML node 213 which the document content region should be bound to. The word processing application 202 operates to automatically parse and use the XPath to locate the desired target for the data binding region. This also means that developers familiar with the XPath standard can leverage this use of XML to create data bindings 205 which are semi-dynamic in nature. That is, identifying a different target node 213 based on other changes to the data 209 or changes to the presentation 203. For example, suppose a user wants to display the name of the employee who has completed the most sales in a given time period. If this information was in the XML data 209 associated with a document 204, a user can create an XPath expression which links to the name of the individual with the highest number of completed specifications, and that link automatically shifts to the appropriate location (node 213) as the data changes. The link can also be changed between nodes 213 through the use of code 211, the user interface, or a programming environment 206.

Alternatively, a user can create a data binding which uniquely identifies the object representing node 213 in the data 209 which the document content region 207 may be bound to. The word processing application 202 operates to automatically determine the XPath to locate the desired target for the data binding region. However, this means that in this case, the data binding 205 will have its XPath updated automatically to ensure that the data binding 205 points at the same object, as opposed to the same XPath expression.

Programming code 211, as described briefly above, may be developed to utilize the XML processing module 212 and react to changes moving in either direction (i.e. from a content region 207 on the document surface 203 to a node 213 in the XML data 209 in the data store 208, and vice versa). A user can develop code 211 that defines relationships between the document surface 203 and specific content within the data store 208. Moreover, code 211 can be developed that reacts to changes within a bound region of the document 204 or within the data store 208, trapping or intercepting events, such as edits, additions, deletions, etc. For example, suppose a user wants to ensure that not more than one document can use a specific title. The code 211, based on what is input into the title node, might check against a central database whether the title is already being used. If the title is taken, the code 211 may prompt the user to enter another title and/or alert the user that the title is unavailable. Embodiments of the invention enable a user to write code 211 a single time with the associated XML, and the code is now portable to all document types that support the use of XML constructs without worrying about the exact semantics of the target application, thereby greatly simplifying and streamlining application development.

According to embodiments of the invention, a word processor document 204 may be tagged with content regions 207 representing semantics for specific regions of text (e.g. Title, Body, etc.) and by adding a data binding 205 the associated text within that content region 207 is now stored in a node 213 inside some XML data 209 in the data store 208 within the document 204. The data 209 is linked to the content region 207 in the document, i.e. tagged regions, using one or more data bindings 205. Accordingly, data 209 can now be stored in a consistent location ("data store") in its own XML stream regardless of where the data binding 205 locates the associated content in the presentation 203, i.e. the digital representation that a user interacts with when editing a particular document (eg. a WORD window depicting a particular user document) of the document 204 or how that data 209 is presented. Thus, a user does not have to worry about data being moved around in the document 204, because the XML data 209 is now located within the data store 208 in a consistent location. Moreover, the data store 208 can contain data 209 which is not referenced by a data binding 205 within a document 204. The "extra" data, such as metadata, etc., provides additional information to users, such as solution developers, which may not be relevant to the document user.

According to embodiments of the invention, the structure of the data is kept in a separate location, one or more pieces of XML data 209 within the document's data stores 208, thereby enabling the user to move around links (i.e. data bindings 205) in the presentation 203, without affecting the data structure. Accordingly, the structure of the XML data 209 does not change, just the presentation of the XML data 209 associated with the word processor document 204 changes. Thus, changing the format of the data presentation in the document 204, does not affect the structure of the data store 208. The user is not moving the actual data 209 by manipulating the document surface 203—thus the user has complete control over the presentation without having to be concerned about ramifications to the data 209, which is being maintained separately in the store 208. Thus, embodiments of the invention allows users to access custom XML information separate from the presentation information.

The one or more data bindings 205 can be used to "bind" content of a data source (XML data 209 in the data store 208), herein termed XML data 209, to locations in the document 204. XML data 209, as used herein, includes any type of content such as text (plain or richly formatted), images, content of a specific type (dates), etc. The structure of a data binding 205 may be described as an XPath link, which allows the word processor application 202 to connect to/synchronize with/persist links to XML nodes 213 in an XML data store 208 associated with a document 204. The XML data store 208 is most preferably a part of the document 204 (i.e. the store 208 is saved to with the word processor file and travels or associates with the particular document 204). A data binding 205 may also contain information to control how the data 209 should be transformed between the presentation (the word processor's document surface 203, for example) and the data store 208. A user of the word processor application 202 can allow the data 209 stored in the data store 208 (the data that is manipulated by the backend applications) to be stored in a standard format, but present the same information in a word processor document 204 in a friendlier format (e.g. the user sees Jan. 29, 2004, but the data is stored in dateTime format as 29-01-004T12:00:00.0000). As another example, the data binding information can contain an image—to the data 209 this image is represented as a seemingly meaningless string of characters, but the same transformation principle described above means that the user will see an image in the content region 207 of the word processor document 204. The user can add/change the image and the XML-encoded representation will be persisted to the XML data 209 so that any backend process can store/manipulate that information.

According to an embodiment, when a user adds data binding information 205 o a content region 207, the user provides the linked XML data 209 of interest (identifying one or more nodes 213, for example) by specifying the XPath expression. Once bound, the content of this content region 207 will be linked or bound to the content (XML data) of the node 213 returned by that XPath. Consequently, this means that if an XML node 213 is added/removed/changed in such a way that the XML node 213 returned by the XPath changes, then the content of the content region 207 in the document 204 updates automatically. Alternatively, if a change occurs which results in no node 213 being returned by a particular data binding 205, then the data binding 205 goes into a 'dangling reference' state, described below.

For example, suppose a document 204 includes the following paragraph, where "Microsoft Corporation" corresponds to a plain text content region 207 (shown in italics) bound to the XPath/contract(1)/header(1)/company(1) in some linked XML data 209 within the data store 208 for that document. The paragraph displayed on the presentation 203 is:

"Microsoft Corporation is located at One Microsoft Way."

According to one embodiment, a link can be set up by specifying a single line of code in a programming environment 206 (for example):

Document.ContentRegions.Add( ).DataBinding.Add("/contract(1)/header(1)/company(1)")

The corresponding linked XML data 209 might look like (with the linked to node 213 depicted in single quotes):

```
<contract>
    <header>
        '<company>Microsoft Corporation</company>'
        <company>Contoso Corporation</company>
    </header>
</contract>
```

Suppose now that a user uses the data store 208 API to add a new <company> node 213 as the first child of <header> (new node 213 in single quotes):

```
<contract>
    <header>
        '<company>Fabrikam Corporation</company>'
        <company>Microsoft Corporation</company>
        <company>Contoso Corporation</company>
    </header>
</contract>
```

The resulting binding 205 on the content region 207 is still bound to the same XPath ("/contract(1)/header(1)/company(1)"), so the document content would immediately update to show the new contents of that node 213:

"Fabrikam Corporation is located at One Microsoft Way."

According to the invention, if one or more regions of a word processor document 204 contain data bound content regions 207, the document 204 reacts to changes to either source of the linked content. Accordingly, if a range of the document 204 is data bound, then changing the contents of the XML node 213 in the associated XML data 209 will result in an automatic change to the text of the content region 207. Correspondingly, if a range of the document 204 is data bound, then changing the text of that bound content region 207 in the document 204, results in an automatic change to the contents of the XML node 213 in the corresponding XML data 209. That is, multiple content regions 207 with identical bindings 205 may exist in multiple places in the document 204. For example, a content region 207 with a data binding 205 to a name may be added to the header as well as the body of a document 204. Changing either of these locations synchronizes that text with the XML data store 208, which will in turn reflect that change wherever a content region 207 with a data binding 205 to that node 213 exists in the document 204.

An XML node 213 in the XML data 209 can have a one-to-many relationship with the document 204, which means that the same XML node 213 in the XML data 209 can be referenced by multiple data bindings 205. Whenever the data bound content region 207 in the document 204 is updated, it causes a change to the appropriate XML node 213 in the XML data 209, which in turn causes all other associated bindings 205 in other content regions 207 in the document 204 to be updated with that new text. For example, suppose a content region 207 in the header of the document 204 is contains a data binding 205 specifying the XPath expression for a <title/> node in some XML data 209 and another content region 207 in the body of the document 204 also contains a data binding 205 to that same element. According to the invention, both will display the same content, even though they may have different formatting. If a user edits the content in the content region 207 in the body of the document 204, that update will be persisted to the appropriate XML node 213 in the appropriate XML data 209 in the data store 208, causing all other content regions 207 with associated bindings 205 in the document 204 (e.g. in the header, footer, etc.) which also specify that XML node 213 to update. Embodiments of the invention provide a mechanism for binding multiple locations in the document to a single XML node 213 in the data store 208, now linking the content of all three of those locations to a single source of data. Accordingly, the contents of all content regions 207 in the document 204 which are linked to the same node 213 in the XML data 209 are identical.

An illustrative example of this is a typical report document, where the user might normally have the title displayed in several locations: on the cover page (in large bold text), in the header (in smaller text), and in the footer (in smaller italicized text). Normally, the user would have to type out the title in each location, ensuring that if the title is changed in any one of these three locations that they remember to change it in the other two (to keep the content consistent). However, it is all too easy to forget to keep all three of these locations in sync. According to an embodiment of the invention, once a data store 208 is in place that contains XML data 209 that the user wants to display in the document 204, multiple locations in the document (e.g. the three locations discussed above) can all be content regions 207 data bound to a single XML node 213 in the data store 208.

Thus, the content of all three locations are linked or bound to a single source of data 209. This means that the user, by changing the contents of any one of these regions (e.g. the cover page) will automatically cause the user's text to be pushed to the underlying XML data 209, and then in turn pushed to the other locations in the document 204 having content regions 207 with corresponding data bindings 205 (in this case, the header and the footer). This means that the user, insofar as their interaction with the document, has now linked or bound these three ranges of content so that they are all identical. According to the embodiments of the invention, the regions of the document can be presented in multiple ways (large and bold, small and italicized, etc.), but the data structure in the data store 208 remains the same.

Dangling References

According to an embodiment of the invention, users can also specify XPath expressions that do not have a target—their specified target XML node 213 does not exist in the XML data 209 in the data store 208. The data binding 205 does not 'forget' its desired target node 213, rather it goes into a 'waiting' state, where it is not connected to any specific XML data 209, but is waiting to see if the desired node 213 appears in the XML data 209 in the backing XML data store 208. This is particularly useful for document assembly scenarios, where each part of a document 204 (for example, a standard cover page, end page, and reused clauses) may contain data bindings 205 which should only be populated when these parts are assembled into a single final document 204. In this case, the document creator specifies data bindings 205 within content regions 207 in each of the document 'parts' to XML nodes 213 in the XML data 209 which did not exist in that part (for example, the cover page might contain a content region with a binding 205 to a <Title> XML element and a <Date/> XML element). When the part is viewed outside of its target document, those bindings are not connected, as no XML data 209 exists, but as soon as the part is added to a document which does contain the desired data 209, the data bindings 205 immediately connect (synchronize) to the data 209 and display the correct content—allowing the document creator to specify bindings 205 and save them even though the data 209 has not yet been generated.

One type of dangling reference 215 occurs when a data binding 205 on a content region 207 cannot be successfully linked to a node 213 in a linked XML stream, (i.e. a state of a binding in a content region). When a node 213 is replaced/removed from a linked XML stream, one or more data bindings 205 may become dangling references 215 as a result. Preferably, if a data binding 205 has a dangling reference 215 due to its XPath, the word processor application 202 continues to store the last known XPath for the node 213 on the data binding 205. This can occur when the XPath no longer resolves to any node 209. Each time the data store 208 messages an update of some XML data 209 to the word processor document 204, the word processor application 202 checks if any dangling references 215 are resolved by the latest update (i.e. the XPath now points to a valid node 213 in the XML tree). If the word processor application 202 resolves a dangling reference, the content of the data store 208 preferably takes precedence over the content currently in the data binding 205—that is, the content of the data binding 205 is replaced by the content in node 213 in the data store 208. Dangling references are preferably exposed using a simple API layer, accessible through one or more programming environments 206.

As an example, suppose a word processor document 204 includes the paragraph below, where Microsoft Corporation corresponds to a plain text content region 207 data bound to the XPath/contract/header/company(3) in some XML data 209:

"Microsoft Corporation is Located at One Microsoft Way."

The corresponding XML data 209 might look like (with the linked to node 213 in single quotes):

```
<contract>
    <header>
        <company>Fabrikam Corporation</company>
        <company>Contoso Corporation</company>
        '<company>Microsoft Corporation</company>'
    </header>
</contract>
```

If a user, such as a developer, uses the data store's 208 API to remove the first <company> node 213 under <header> (node 213 in single quotes):

```
<contract>
    <header>
        '<company>Fabrikam Corporation</company>'
        <company>Contoso Corporation</company>
        <company>Microsoft Corporation</company>
    </header>
</contract>
```

The resulting data binding 205 on the content region 207 in the document 204 maintains a link to the same XPath, so the data binding 205 becomes a dangling reference 215 to the now non-existent \contract\header\company(3):

```
<contract>
    <header>
        <company>Ford Corporation</company>
```

-continued

```
        <company>Intel Corporation</company>
    </header>
</contract>
```

This means that internally we have a broken link, but in accordance with the invention, the content of the content region 207 does not change, and no errors occur, i.e., "Microsoft Corporation is Located at One Microsoft Way."

When some XML data 209 is replaced or removed (or when a link is moved from one document to another), then all data bindings 205 which reference that XML data 209 immediately become dangling references 215 pointing to the deleted XML data 209. If a data binding 205 contains a dangling reference 215, the word processor application 202 continues to store the last known XPath/namespace link associated with the data binding 205. According to an embodiment of the invention, when a set of data bindings 205 become dangling references 215, the word processor application 202 attempts to reattach these links to any other available XML data 209 in the associated XML data store 208. If any of the data bindings 205 do resolve to a node 213 in another XML data 209, then all of the dangling references 215 associate to this XML data 209, updating the associated content regions 207 for which data bindings 205 are now connected. If this XML data 209 does not result in valid data bindings 205 for any of the dangling references 215, the word processor application 202 performs a similar check with each XML data 209 in the data store 208, etc. If none of the XML data 209 can be used for the dangling references 215, then the bindings remain dangling references 215 to the original XML data 209.

Figure 3:
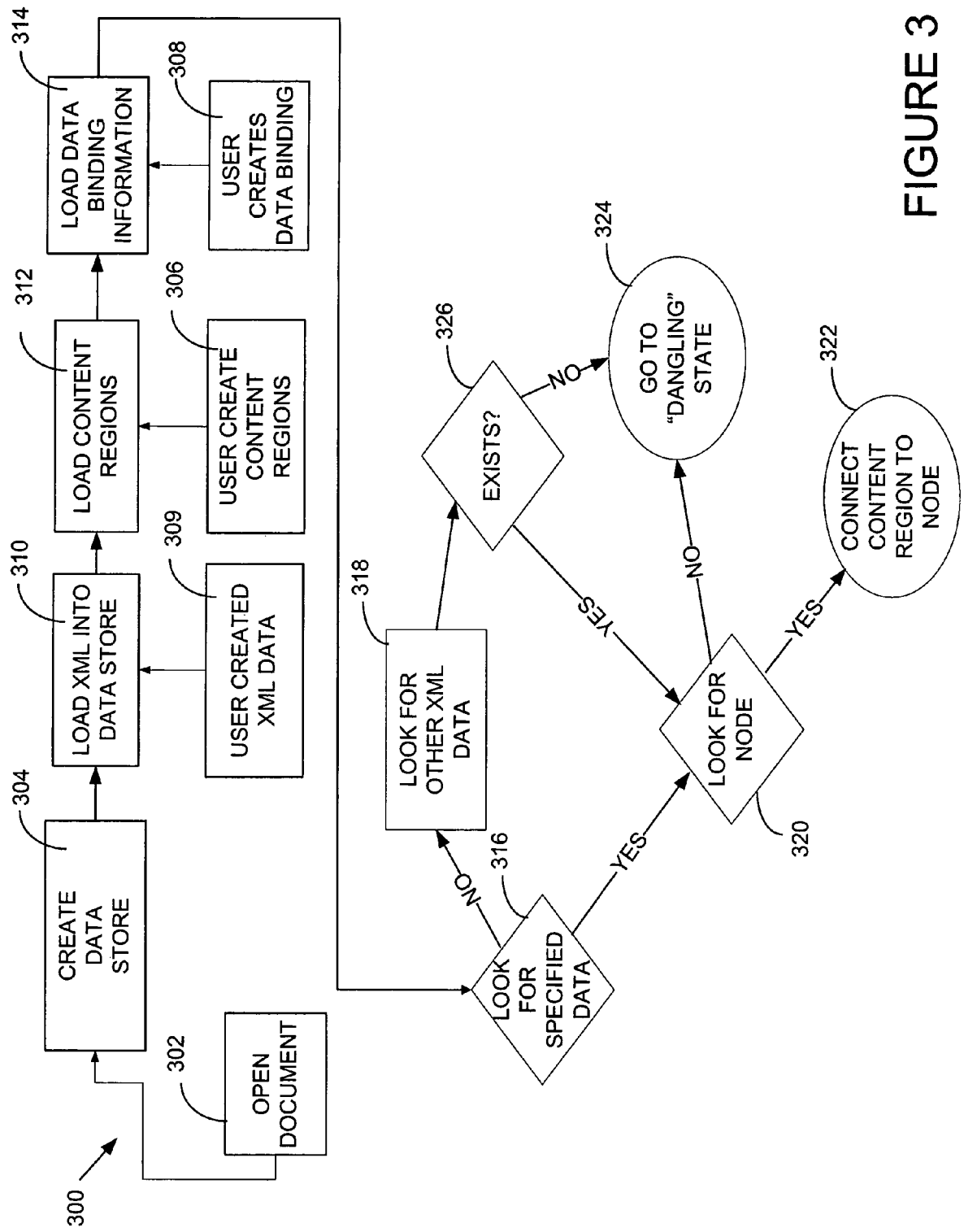

Referring to the flow diagram depicted in FIG. 3, and with continuing reference to FIG. 2, an embodiment of the invention is described. The process 300 shown in FIG. 3 begins at 302 when a user opens a word processor document 204, using a word processing application 202. At 304, the word processing application creates a data store 208, which is then in 310 populated with any XML data 209 stored in the word processor document 204 or requested by using user interface or programming window 206. The data store 208 is preferably included as part of the document 204, but is not visible on the document editing surface 203. It will be appreciated that the data store 208 may be loaded before creating the content regions 207 and data bindings 205. Likewise, the content regions 207 can be created before the data store 208. In other words, the various operations depicted in FIG. 3 do not have to be carried out in any particular order and can be implemented according to a particular user's preference.

At 306, the user creates one or more content regions 207 which exist on the surface 203 of the document 204. Note that these content regions can also be read from the existing contents of the document 204. At 308, the user can associate data binding information with a content region 207, by providing a particular linked XML data 209 and an XPath expression specifying the target node 213. The one or more data bindings link one or more nodes 213 of XML data 209 in the data store 208 to one or more content regions 207. The data binding 205 becomes bound or dangling. As described above, each node 213 may be bound to a plurality of content regions 207, each one specifying a data binding 205 to the same XML node 213. Moreover, the data bindings 205 may be linked to multiple data stores 208. At 309, the user may create XML data, either in a content region 207 or the date store 208. At 310, the word processor application 202 loads all XML data into a data store 208. At 312, the word processor application 202 loads the content regions 207 from the document 204 or as requested by the user 306, and at 314, the word processor application 202 loads the data bindings 205 from the document 204 or as requested by the user 308. At 316, the word processor application 202 checks to see if the XML data 209 associated with node 213 specified by a particular data binding 205 exists.

If the XML data 209 does not exist, at 318, the word processor application 202 determines whether other XML data 209 exists within the same XML namespace. If the XML data 209 is located within the data store at 316, at 320, the word processor application 202 determines if the associated XML node 213 for the specified XPath exists. If the XPath exists, at 322, the word processor application 202 connects the various document content, i.e. content regions 207 and any other linked content, to the associated XML node or nodes 213 via the data binding. If the XPath is not located at 320, the word processor application 202, at 324, labels the particular data binding 205 as a dangling reference 215 (enters the dangling state). If at 318, other XML data 209 is found in the same XML namespace within the data store 208, at 326, the word processor application 202 again checks to see if the XML node 213 exists within that data.

If the XML data 209 does not exist, the word processor application 202 labels the particular data binding 205 as a dangling reference (enters the dangling state) at 324. If the XML data 209 is found to exist at 326, then at 320, the word processor application 202 searches for the desired XPath within that XML data 209. If the node 213 is found, at 320, the word processor application 202 connects the document content, i.e. content regions 207 and any other linked content, to the associated XML node or nodes 213 at 322.

It should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations making up the embodiments of the present invention described herein are referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

The above specification, examples and data provide a complete description of the manufacture and use of the composition of the invention. Since many embodiments of the invention can be made without departing from the spirit and scope of the invention, the invention resides in the claims hereinafter appended.

We claim:

1. In a word processor application, a method of providing a word processor document comprising:
    opening the word processor document;
    providing a presentation surface configured to:
        present the word processor document including presenting one or more content regions for displaying contents of the word processor document in a document format of the word processor document; and
        receive changes to the document format of the word processor document independent of changes to the contents of the word processor document stored with the presentation surface;
    creating a data store after opening the word processor document, wherein the data store is configured to:
        store one or more nodes of document data representing the contents of the word processor document; and
        receive changes to the contents of the word processor document independent of changes to the document format of the word processor document;
    load the data store with XML data that is stored within the word processor document;
        storing the document data separately from the presentation surface;
        representing a structure of the document data in a schema file stored with the document data;
        providing one or more bindings associating the one or more content regions with the one or more nodes of the document data that is stored within the data store; wherein the one or more bindings allows changes to a location of the contents of the word processor document stored with the presentation surface to be made on the presentation surface without changing a location and the structure of the XML data within the data store; and
        determining when one of the bindings refers to a nonexistent location in the data store and attempting to rebind the one or more content regions with another one of the one or more of the document data.

2. The word processor application of claim 1, wherein the method further comprises providing access to data in the data store.

3. The word processor application of claim 2, wherein the method further comprises editing of the data directly within the data store.

4. The word processor application of claim 3, wherein the method further comprises updating the one or more content regions associated with the data edit.

5. The word processor application of claim 1, wherein the method further comprises updating associated data in the data store based on an edit of one or more content regions.

6. The word processor application of claim 1, wherein the method further comprises creating a dangling reference when a data binding refers to a nonexistent location in the data store.

7. The word processor application of claim 1, wherein the method further comprises exposing a programming interface to the word processor application, and using the programming interface to develop code for causing/reacting to changes in the data store or in one or more content regions of the presentation surface.

8. The word processor application of claim 1, wherein the method further comprises updating content of multiple content regions based on a modification associated with at least one node in the data store.

9. A word processor system for providing a word processor document comprising:
    a presentation surface store for storing a word processor presentation surface for presenting content of a word processor document in a format of the word processor document and receiving changes to the document format of the word processor document independent of changes to the contents of the word processor document;
    a content store that is created after opening the word processor document for storing first data including the content of the word processor document, the first data including one or more nodes of document data including portions of the content and receiving changes to the content of the word processor document independent of changes to the document format of the word processor document, wherein the content store is stored separately from the presentation surface store; wherein the content store is loaded with XML data that is stored within the word processor document; and wherein a schema file stored with the document data represents a structure of the document data; and a binding for binding the one or more nodes of first data in the content store to an area of the document and attempting to rebind the one or more nodes when it is determined that the binding refers to a nonexistent location in the content store; wherein the binding allows changes to a location of the contents of the word processor document stored with the presentation surface to be made on the presentation surface without changing a location and the structure of the XML data within the data store.

10. The word processor of claim 9 further comprising a second store for storing second data.

11. The word processor of claim 10 further comprising a first schema associated with the content store and a second schema associated with the second store.

12. The word processor of claim 9 further comprising a programming interface for developing code to monitor the content store.

13. The word processor of claim 9, further comprising creating a dangling reference when a link refers to an unknown location in the content store.

14. A storage medium storing computer-executable components, comprising:

a presentation surface store for storing a word processor presentation surface for presenting content of a word processor document in a format of the word processor document and receiving changes to the document format of the word processor document independent of changes to the contents of the word processor document;

a content store that is created after opening the word processor document for storing first data including the content of the word processor document, the first data including one or more nodes of document data including portions of the content and receiving changes to the content of the word processor document independent of changes to the document format of the word processor document, wherein the content store is stored separately from the presentation surface store; wherein the content store is loaded with XML data that is stored within the word processor document; and wherein a schema file stored with the document data represents a structure of the document data; and a binding for binding the one or more nodes of first data in the content store to an area of the document and attempting to rebind the one or more nodes when it is determined that the binding refers to a nonexistent location in the content store; wherein the one or more bindings allows changes to a location of the contents of the word processor document stored with the presentation surface to be made on the presentation surface without changing a location and the structure of the XML data within the data store.

15. The storage medium of claim 14, further comprising a second store for storing second data.

16. The storage medium of claim 15 further comprising a first schema associated with the content store and a second schema associated with the second store.

17. The storage medium of claim 14 further comprising a programming interface for developing code to monitor the content store.

18. The storage medium of claim 14, wherein the word processor is further operable to create a dangling reference when a link refers to an unknown location in the content store.

19. The storage medium of claim 14, wherein the word processor is further operable to create a dangling or bound link.

* * * * *